May 10, 1927.
D. P. OWENS
1,628,553
ANGLE SCREW DRIVER AND ATTACHMENT
Filed Nov. 20, 1925
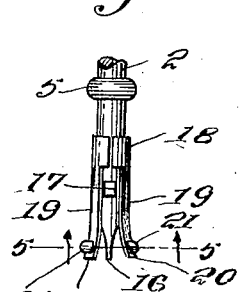
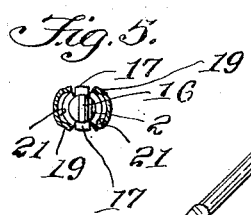
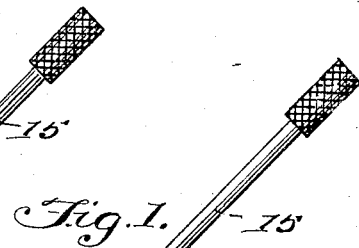
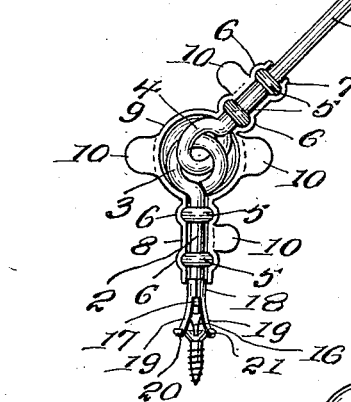
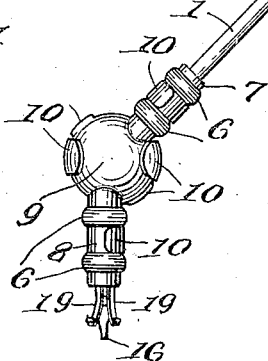
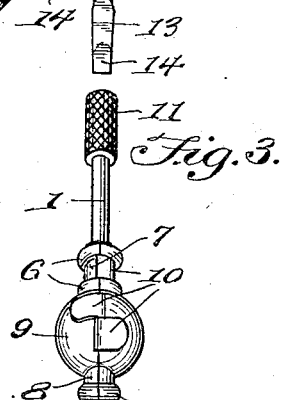
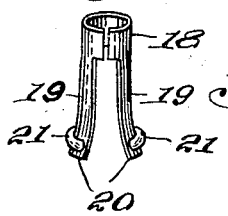
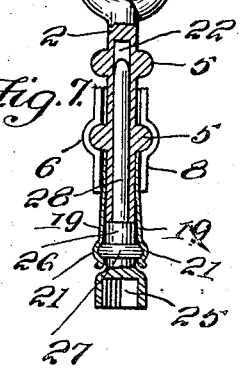
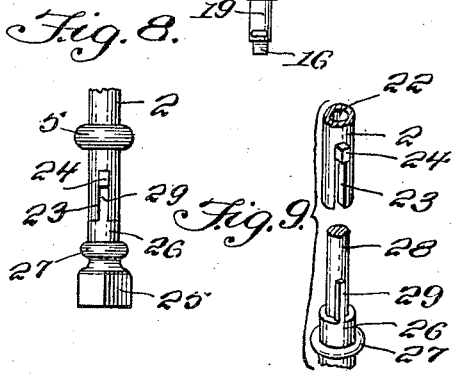
Dabney P. Owens
INVENTOR
BY Victor J. Evans
ATTORNEY
WITNESS: J. J. L. Wright Patented May 10, 1927.

1,628,553

UNITED STATES PATENT OFFICE.

DABNEY P. OWENS, OF LAKE WORTH, FLORIDA.

ANGLE SCREW DRIVER AND ATTACHMENT.

Application filed November 20, 1925. Serial No. 70,348.

My present invention has reference to tools and is especially directed to a screw driver of a small type such as is adaptable for use on radio cabinets or the like.

My primary object is the provision of a screw driver of this type which may be successfully employed for driving screws in close places.

A further object is the provision of a screw driver that includes a handle and a shank which is arranged at an angle with respect to the handle, and in which there is a universal joint connection between the shank and handle housed in a simple but novel manner to prevent thrust between the joint elements.

A still further object is the provision of an angle screw driver of a universal joint connected type that includes a handle and a shank arranged angularly with respect to the handle, both handle and shank being formed from rods which have their confronting ends bent to provide interengaging eyes that are encased in a suitable housing, and wherein the knurled outer end of the handle is formed with a rectangular socket to receive therein the rectangular end of the bit portion of a second screw driver, whereby to provide a handle extension, and further wherein the shank has a novel clutch means associated therewith for holding a screw on the bit thereof or for holding a socket element on the said shank so that the device, in addition to being employed as a screw driver may be likewise successfully employed for turning nuts or bolts.

To the attainment of the above broadly stated objects and others which will appear as the nature of the invention is better understood, the improvement further resides in certain novel features of construction, combination and operative association of parts, a satisfactory embodiment of which is illustrated by the accompanying drawings.

In the drawings:

Figure 1 is a side elevation of the improvement, partly in section.

Figure 2 is a similar view but showing one section of the housing removed and the separable screw driver or handle extension withdrawn from its socket.

Figure 3 is an edge view of the improvement.

Figure 4 is a fragmentary enlarged elevation of the outer end of the shank, with the clamp or clutch element thereon.

Figure 5 is a sectional view on the line 5—5 of Figure 4.

Figure 6 is a perspective view of the clutch element or clamp.

Figure 7 is a sectional view through the shank to illustrate a manner in which a socket element may be associated therewith.

Figure 8 is a fragmentary elevation of the shank with the socket member thereon.

Figure 9 is a fragmentary perspective view of the socket member and shank disassociated.

Referring now to the drawings in detail, the numeral 1 designates the handle of my improvement, and 2 the shank thereof. Both the shank and handle are formed of rod members and have their confronting ends rounded upon themselves to provide interengaging eyes 3 and 4. Outward of the eyes the members 1 and 2 are formed with rounded enlargements or bosses 5. Two of the bosses are arranged on each of the members 1 and 2, and these bosses are received in suitable annular depressions 6 in sleeves 7 and 8 which extend angularly from a spherical housing 9, in which the interengaging rings 3 and 4 are received.

As disclosed by the drawings the housing 9 is made up of two sections which have their edges formed with ears 10, and the ears on one of the sections are designed to be bent over the confronting section, and whereby the housing may be cheaply constructed and the sections thereof readily assembled or disassociated. The bosses when seated in their bearings prevent end thrust between the interengaging rings 3 and 4, and by an arrangement as just described it will be noted that I produce a simply constructed, cheaply manufactured angle screw driver of the universal joint type.

The outer end of the handle 1 is enlarged and knurled, as at 11, and is provided with a rectangular bore 12. The walls of this bore are designed to be contacted by a rectangular portion 13 on the bit end 14 of a removable screw driver 15 which affords an extension for the handle 1. Of course, the member 15 is only employed when the handle 1 is to be extended.

The shank 2 may be integrally formed with or have removably secured on its outer end a bit 16. The shank inward of the bit is formed with an outwardly extending lug 17. The shank, inward of the lug, has arranged therearound a split spring sleeve 18 which forms the body member of a clamp or chuck. From the body member there is extended outwardly directed oppositely disposed arms 19. The ends of the arms are flared outwardly, as at 20, and the said arms inward of the said ends are formed with lateral depressions providing outwardly bulged portions 21. The arms 19 exert a tension toward each other and are designed to grip therebetween the head of the screw, which is received in the depressed portions of the said arms. When the screw is driven home the arms will contact with the surface in which the screw is driven, and by virtue of such contact will spread away from each other, thus releasing the screw and permitting the same to be driven fully home.

I have stated that the bit 16 may be removably associated with the shank 2 if desired, and in Figures 7 to 9 I have shown the shank provided with a longitudinal bore 22 which extends from the outer end thereof. This hollow shank, from its said outer end, is slotted longitudinally as at 23, and the terminal of the slot is provided with an outstanding lug 24, similar to the stop lug above described.

In the said figures I have shown a socket wrench 25 associated with the shank 2, although, of course, the bit 16 may be connected with the shank in the manner which will now be described as may be other tools or elements that are necessarily revoluble in operation. The socket 25 is formed with an enlargement or boss 26 centrally formed with an outstanding rounded enlargement 27. From the boss there extends a cross sectionally rounded stem 28 that is received in the socket 22. The stem, at its juncture with the boss, is formed with a rib 29 that is received in the slot 23, whereby the stem is locked on the shank 2. The clamp or clutch member is arranged on the stem as previously described, and is moved so that the depressions in the arms thereof will engage the enlargement 27 on the extension 26 of the socket member 25, thereby effectively holding the said socket on the tool.

It is believed that when the foregoing description is carefully read in connection with the accompanying drawing, the simplicity of my construction and the advantages thereof will be perfectly apparent to those skilled in the art to which this invention relates, but it is to be understood that I do not wish to be restricted to size, proportion, material employed, etc. and further that I am entitled to make such changes as fall within the scope of what I claim providing the same do not depart from the spirit or sacrifice any of the advantages of the invention.

Having described the invention, I claim:—

A tool of the class described including a handle, a shank arranged angularly with respect to the handle, and both shank and handle having their confronting ends rounded to provide eyes which interengage, a ball housing receiving the interengaging eyes therein and having sleeve extensions for the shank and handle and bearing means between the shank, handle and such sleeves which prevent the longitudinal movement of either the shank or the handle.

In testimony whereof I affix my signature.

DABNEY P. OWENS.